Jan. 29, 1957  M. O. LONGSTRETH ET AL  2,779,053
METHOD AND APPARATUS FOR PRODUCING ORIENTED PLASTIC FILMS
Filed March 9, 1955  2 Sheets-Sheet 1

INVENTORS
Murrey O. Longstreth
Turner Alfrey, Jr.
BY
Griswold & Burdick
ATTORNEYS Jan. 29, 1957 M. O. LONGSTRETH ET AL 2,779,053
METHOD AND APPARATUS FOR PRODUCING ORIENTED PLASTIC FILMS
Filed March 9, 1955 2 Sheets-Sheet 2

INVENTORS
Murrey O. Longstreth
BY Turner Alfrey, Jr.

Griswold & Burdick
ATTORNEYS

United States Patent Office 2,779,053
Patented Jan. 29, 1957

2,779,053

METHOD AND APPARATUS FOR PRODUCING ORIENTED PLASTIC FILMS

Murrey O. Longstreth and Turner Alfrey, Jr., Midland, Mich., assignors to The Dow Chemical Company, Midland, Mich., a corporation of Delaware Application March 9, 1955, Serial No. 493,178

9 Claims. (Cl. 18—1)

This invention relates to a method and apparatus for simultaneously drawing and stretching thermoplastic films so that the film is capable of substantially equal elongation in all directions in the plane of the film.

Plastic films, such as are used for wrapping or packaging purposes, are made most commonly by extruding the plastic in molten form, either as a sheet or a tube, and stretching the extruded article to reduce its thickness and to orient the molecules parallel to the major plane of the resulting film. Films produced by methods heretofore used vary considerably in their elongation values as measured in different directions across their major plane. Such differences in elongation under stress are due to corresponding differences in the amounts of stretch imparted during production in the direction of extrusion and at various angles transverse thereto. Since the most generally useful films are those which are equally yieldable, or equally resistant to stress in all directions in their major plane, it has been a longstanding objective to effect equal and multidirectional stretching during the production of thin films from organic thermoplastics. Tenters, moving along divergent paths, have been used to stretch flat plastic sheets both longitudinally and transversely, but these have many manipulative problems, and have met with little acceptance in the trade. Tubular extrusions have been stretched radially about the tube axis and longitudinally by various mechanical means and by combinations of mechanical and pneumatic or hydraulic internal distension means. Even the best of these methods presents difficulties in achieving a truly uniform stretching in all directions, and the films produced are not as uniform as is desired.

It is the principal object of this invention to provide a new method and apparatus for producing plastic film which exhibits substantially equal evidences of orientation in all directions in the plane of the film. A particular object is to provide such a method and apparatus whereby a film is drawn and stretched multidirectionally in one continuous operation and at a high rate of production, the film exhibiting substantially uniform orientation in all directions. Other and related objects may appear hereinafter.

The method whereby the objects of the invention are attained comprises feeding heat-softened organic thermoplastic film-forming material radially outwardly from a central feed point. The resulting sheet is brought into contact with a plurality of evenly spaced cutters disposed equidistant from the central feed point, thereby producing a plurality of sheets extending outward from the unitary central sheet. Each of said sheets is engaged in the nip between a different set of takeaway rolls of essentially the same width as the so-engaged sheet, the several sets of said takeaway rolls forming a closed polygon centered about the central feed point. All of said sets of rolls are driven at the same peripheral speed to effect continuous and uniform radial stretching and to produce a sheet of uniform strength in all directions.

The new apparatus radially stretches a flat sheet of film which is supplied from a central extrusion orifice. The stretching is achieved by means of several pairs of draw rolls arranged in a closed polygon about the central orifice. Slitting means are provided between adjacent pairs of rolls to divide the central sheet into a plurality of individual sheets as the latter are fed individually to the draw rolls.

The apparatus of the invention will be described with respect to a preferred embodiment illustrated in the accompanying drawings, wherein Fig. 1 is a simplified plan view of the machine;

Figure 2:
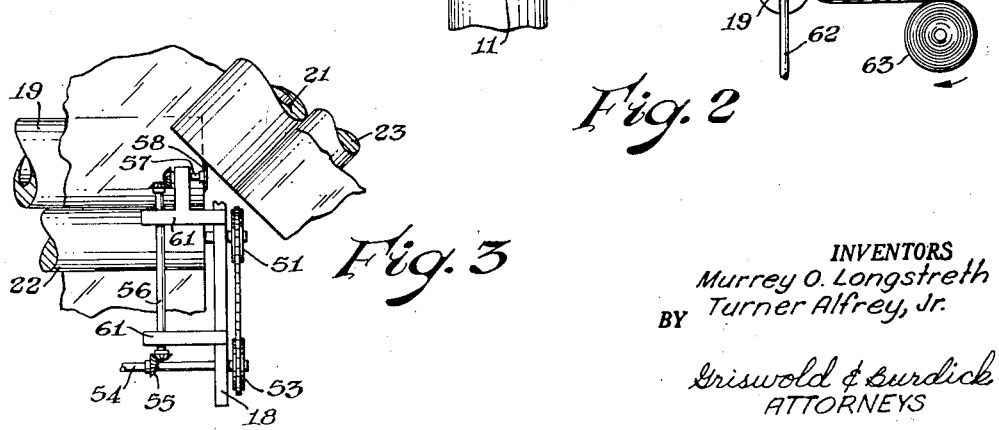
Fig. 2 is a vertical cross-section taken along line 2—2 of Fig. 1.

The first requisite for any embodiment of the new apparatus is a central feed for fused or molten thermoplastic material from which the material is delivered radially outward as a plastic sheet. One means for producing a substantially planar sheet of plastic about a central point is the extruder die head described by one of the present inventors and another in concurrently executed application Serial No. 492,439, filed March 7, 1955. That die head is illustrated diagrammatically in Fig. 2 of the present drawings and comprises an end plate 10 and dependent core 11 concentrically mounted over the end of a vertically disposed extruder barrel 12, with uniform radial clearance between the core 11 and barrel 12, and between the end of barrel 12 and the bottom surface of end plate 10, providing a circumferential orifice 13 in the horizontal plane.

Figure 1:
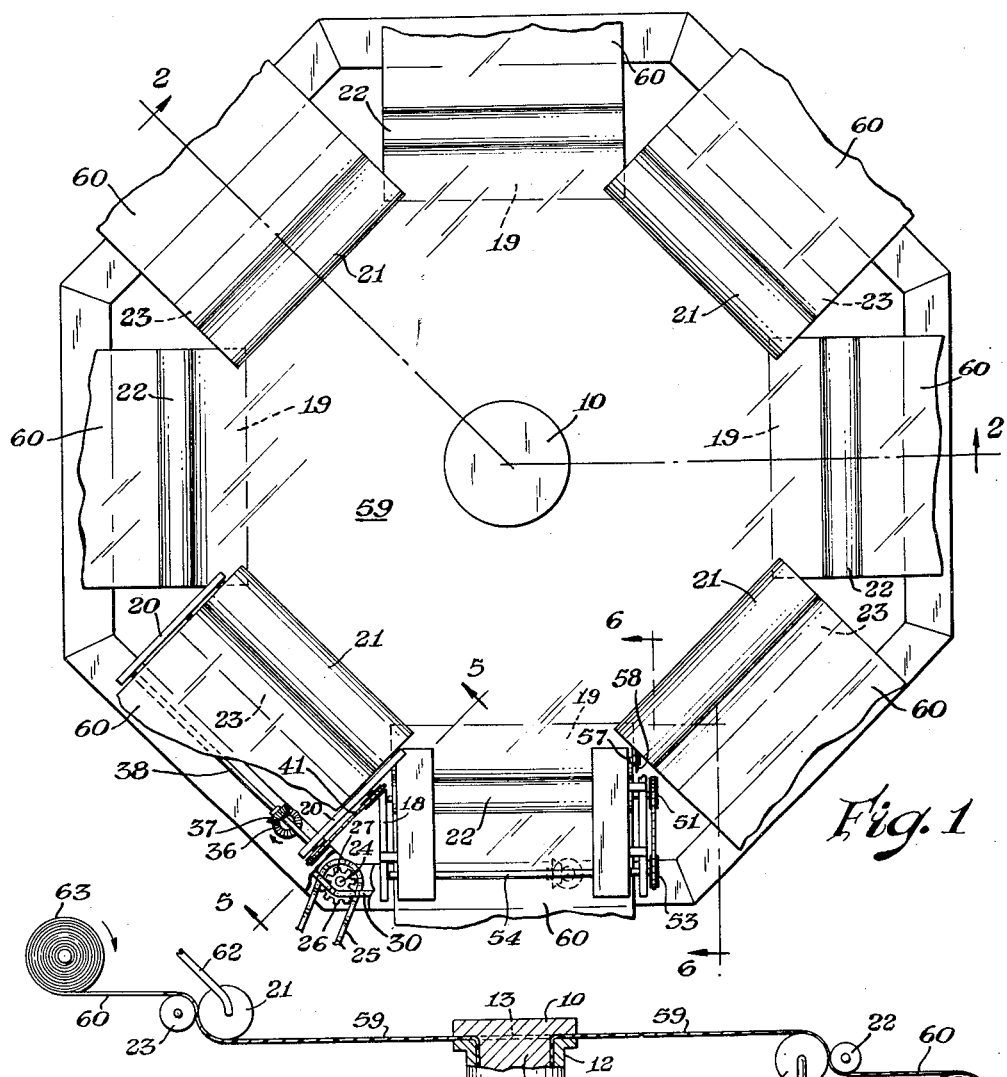

In the embodiment of the apparatus shown in Fig. 1, the extrusion apparatus is centered with respect to the draw rolls, the pairs of which are arranged as the sides of a closed octagon. Any closed polygonal form may be used, in which the perpendicular bisectors of the several sides intersect at the center, but the preference is for regular polygons with six or more sides. Each side of the polygon consists of a set of the takeaway or draw rolls and auxiliary equipment, capable of drawing and stretching a sheet extruded radially from the centrally located die orifice 13. In the illustrated and preferred embodiment, the pairs of draw rolls are mounted alternately above and below the horizontal plane of the sheet, suitably in the positions shown in Fig. 2. This arrangement, though not essential, permits a spacing of the rolls so as to provide effective and equal stretching action about the entire closed perimeter of the polygon.

Figure 4:
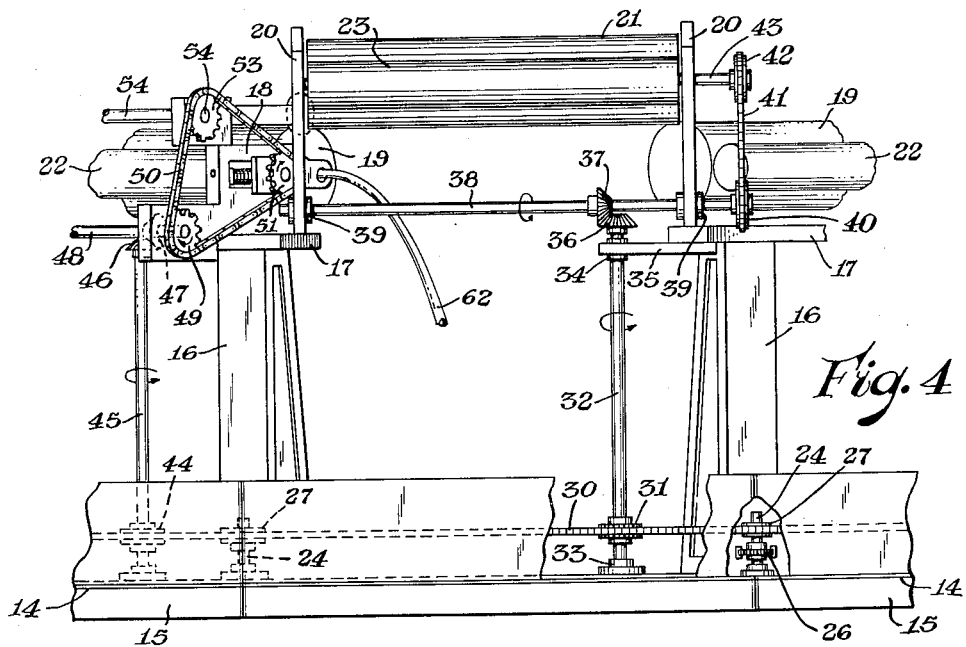
Fig. 4 is a side elevation of the machine of Fig. 1 showing one form of drive mechanism.
Figure 5:
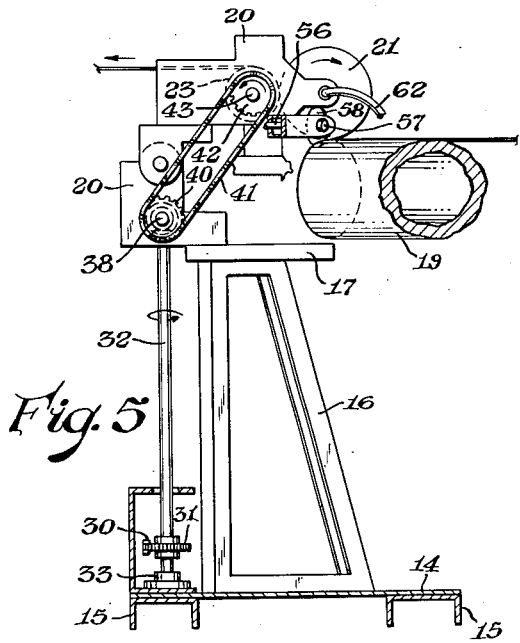
Fig. 5 is an elevation in partial vertical section taken along line 5—5 of Fig. 1, showing further details of the drive and cutters; and, Fig. 6 is a similar view taken along line 6—6 of Fig. 1.
Figure 6:
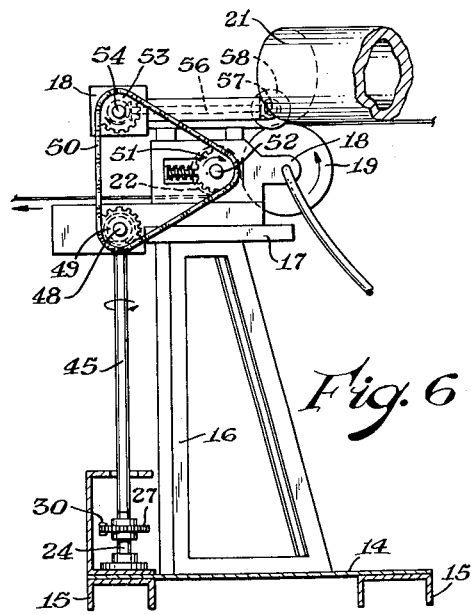

The supporting framework of the apparatus (not shown in Fig. 1, but illustrated in Figs. 3–5) comprises base plates 14, suitably mounted on channels 15, disposed in the same polygonal form as the rolls to be supported. At each angle of the polygon is mounted over base plate 14 a rigid pedestal 16, all of uniform height, and each pedestal 16 is surmounted by a cap plate 17 which may, for convenience be a trapezoidal shape with its short edge directed toward the center of the polygon. On each cap plate 17 is mounted a vertical bracket 18 for supporting one end of a set of the lower draw rolls 19, 22 and related drive and cutting mechanisms, to be described later, and a taller vertical bracket 20 for supporting one end of the adjacent set of upper draw rolls 21, 23 and its associated drive. The larger rolls 19, 21 are here shown as idler rolls, driven by the smaller rolls 22, 23.

In longitudinal pressure relationship with each lower idler roll 19, and supported in the same bracket 18, away from the center of the polygon, is a generally smaller roll 22. Rolls 19 are preferably hollow metallic rolls and rolls 22 are preferably rubber-faced driven rolls, serving to turn rolls 19. Similarly, with each upper idler roll 21, preferably hollow and metallic, there is an associated pressure roll 23 mounted in brackets 20, serving the same function and in the same manner as rolls 22. The several rolls 22, 23 are adapted to be driven simultaneously and at the same peripheral speed, suitably by the common drive mechanism illustrated in the drawings and described below. Fig. 1 shows elements of the drive associated with only two sets of draw rolls, but it is to be understood that each set of such rolls is similarly equipped.

In the illustrated embodiment, a vertical stub shaft 24 is mounted on base plate 14 at each of the angles of the polygon externally of pedestal 16. Each shaft 24 carries a sprocket 27, and an endless chain 30 engages all of the sprockets 27. One of the shafts 24 carries another sprocket 26 which engages drive chain 25. The shafts 24 are driven from a power source (not shown) through chain 25, sprocket 26, and sprockets 27 and chain 30. Chain 30 also engages a sprocket 31 mounted near the base of a vertical shaft 32, one of which is positioned beneath and externally of each set of upper driven rolls 23. Each such shaft 32 is mounted for rotation in a lower bearing 33 on base plate 14, and extends through an upper bearing 34 shown as in a horizontal arm 35 projecting out from and supported by cap plate 17. The shafts 32 carry a bevel gear 36 at their upper extremity, and each such gear 36 engages a similar gear 37 mounted on a rotatable horizontal shaft 38 which is supported in bearings 39 in brackets 20. Each shaft 38 carries, at one end thereof, a sprocket 40 which serves to drive pressure roll 23 through chain 41 and sprocket 42, the latter being mounted on the outer end of the axial shaft 43 of roll 23.

Figure 3:
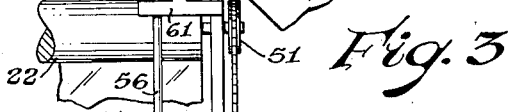
Fig. 3 is a detail of one of the cutters and its mounting and drive.

In a similar manner, chain 30 engages sprocket 44 mounted near the base of a vertical, rotatable shaft 45, one of which is positioned beneath and externally of each set of lower driven rolls 22. Each shaft 45 carries a bevel gear 46 at its upper end, engaging a similar gear 47 on a rotatable horizontal shaft 48 which is supported in bearings through a rearwardly and downwardly projecting extension of bracket 18. One end of each shaft 48 carries a sprocket 49 for driving pressure roll 22 through chain 50 and sprocket 51, the latter being mounted on the outer end of axial shaft 52 of roll 22. Chain 50 also engages sprocket 53 mounted on the end of horizontal shaft 54 supported in brackets 18 behind and at a level just above the top of idler roll 19. Secured near each end of shaft 54, as shown in Fig. 3, are bevel gears 55, each of which drives a horizontal shaft 56 which, in turn, drives another shaft 57 at right angles thereto and carrying at its outer end a rotary cutter disk 58 positioned to engage the central film 59 just as it reaches the upper surface of rolls 19 and the lower surface of rolls 21, to sever the film 59 into sheets 60 of the width of rolls 19 and 21. Shafts 56 and 57 may be supported by arms 61 projecting from brackets 18.

An adjustable pressure may be applied in known manner against the bearings supporting rolls 22 and 23, to bring these rolls into driving relationship with the idler rolls 19 and 21, through the intervening film strips 60.

The rolls 19 and 21 are preferably hollow and internally cooled, as by circulating cold water through tubes 62 to an axial bore in each end, for the purpose of cooling and controlling the temperature of film as it passes through the rolls.

In operation of the machine, hot plastic film forming material is extruded radially as a sheet 59 from the circumferential orifice slit 13 of a vertically disposed head of extruder 12, and portions of the edge of the extruded sheet are grasped and fed to the nips between rolls 19, 21 and 22, 23. The rate at which the rolls are driven is adjusted so that the desired thickness reduction of the central sheet 59 occurs as it is stretched between the central orifice 13 and the relatively cool surfaces of the draw rolls. Stretching is effective simultaneously in all directions within the sheet, and to a uniform degree over its entire area. The cutters 58 divide the central film into as many sheets 60 as there are sets of draw rolls. From the draw rolls the finished sheets are taken continuously to storage or windup rolls 63. When, as in the illustrated embodiment, the maximum distance from the extrusion orifice to the point of contact between the film and the draw rolls is about equal to the length of the several draw rolls, the amount of stretch to which the central film sheet 59 is subjected is necessarily uniform in all directions, and samples cut from the resulting films 60 show evidence of substantially identical orientation in all directions across the plane of the film.

The new method and apparatus are useful in the production of film from a variety of organic thermoplastic materials, typical of which are polystyrene, polyethylene, plasticized polyvinyl chloride, vinyl chloride-vinyl acetate copolymers, and polymeric ethyl acrylate.

In a specific example, polyethylene was extruded at a temperature of 199° C. at the rate of 130 pounds per hour from the described circumferential orifice with the orifice opening set at 0.042 inch. The draw rolls were kept at about 15° C. by circulating cold water through the hollow idler rolls, and were turned at a peripheral speed of 20 feet per minute. The so-stretched film had an average gauge of 0.00117 inch as it left the eight sets of draw rolls. Samples were cut from the eight sheets of film, longitudinally, transversely, and at 45° with respect to the direction taken by the film leaving the draw rolls. Elongation values were measured on all samples, and the percent elongation to break was recorded. Similar tests were made on longitudinal and transverse samples of each of several commercially produced polyethylene films of different manufacturers. The data, reported in the following table, represent averages of 3 or more determinations on replicate samples in each case.

| Sample | Percent elongation to break | | |
| --- | --- | --- | --- |
| | Longitudinal | Transverse | Diagonal |
| This invention: | | | |
| Single sheet | 489 | 492 | 480 |
| Eight sheets (ave.) | 477 | 486 | 480 |
| Commercial products: | | | |
| Manufacturer A | 248 | 734 | |
| Manufacturer B | 276 | 900 | |
| Manufacturer C | 297 | 667 | |
| Manufacturer D | 555 | 737 | |
| Manufacturer E | 490 | 705 | |
| Manufacturer F | 251 | 629 | |

It is apparent that the present apparatus and method furnish films of extremely uniform orientation in all directions.

We claim:

1. The method which comprises distributing fused organic thermoplastic material and moving it continuously as a unitary thin sheet outwardly from a center, slitting the moving sheet radially at fixed points spaced about its circumference, grasping each of the so-separated sheets individually and conveying it radially away from the center at a linear rate at least as great as the rate of formation of the central unitary sheet.

2. The method which comprises feeding heat-softened organic thermoplastic film-forming material as a sheet radially outwardly in all directions from a central feed point, conducting the resulting unitary central sheet into contact with a plurality of cutters disposed equidistant from the central feed point and spaced approximately symmetrically thereabout at angles of a circumscribing polygon, thereby producing a plurality of sheets, each of fixed width, extending outward from the unitary central sheet, engaging each of said sheets in the nip between a different set of relatively cool draw rolls of essentially the same width as the so-engaged sheet, the several sets of said rolls forming a closed polygon centered about the said feed point, and driving all of said sets of rolls at the same peripheral speed to effect continuous and uniform radial stretching of each film sheet.

3. Apparatus for producing continuously and simultaneously a plurality of flat sheets of organic thermoplastic film, comprising means for distributing heat-softened plastic material continuously as a unitary thin sheet radially outward from a center, a plurality of pairs of draw rolls disposed symmetrically about said center to form a closed polygon, each such pair of rolls having a sheet-engaging nip therebetween, means disposed about the perimeter of the polygon between contiguous pairs of draw rolls for slitting said unitary sheet into strips of the same widths as the draw rolls, and means for driving the draw rolls simultaneously and at the same peripheral speed.

4. The apparatus claimed in claim 3, wherein the means for forming the central unitary plastic sheet comprises an extruder with a vertically disposed head having a circumferential orifice in the horizontal plane.

5. The apparatus claimed in claim 3, wherein the draw rolls are mounted tangent to the plane through the central source of the unitary thin sheet.

6. The apparatus claimed in claim 3, wherein the said closed polygon is regular and has an even number of at least six sides, and consecutive draw rolls about the polygon are mounted on opposite sides of the horizontal plane through the central film supply.

7. The apparatus claimed in claim 3, wherein the said closed polygon is a regular octagon.

8. The apparatus claimed in claim 3 wherein the draw rolls first contacted by the film are cooled metal rolls.

9. The apparatus claimed in claim 3 wherein the said polygon is regular and the distance from the central source of the thin sheet to the draw rolls is approximately equal to the length of one side of the said closed polygon.

UNITED STATES PATENTS
References Cited in the file of this patent

| | | |
|---|---|---|
| 2,342,977 | Snyder | Feb. 29, 1944 |
| 2,608,750 | Cluzel | Sept. 2, 1952 |